US010004007B2

United States Patent
Premec (10) Patent No.: US 10,004,007 B2
(45) Date of Patent: *Jun. 19, 2018

(54) METHOD, SYSTEM AND DEVICE FOR LOCATION UPDATE IN NETWORKS

(71) Applicant: Nokia Solutions and Networks Oy, Espoo (FI)

(72) Inventor: Domagoj Premec, Zagreb (HR)

(73) Assignee: Nokia Solutions and Networks Oy, Espoo (FI)

( * ) Notice: Subject to any disclaimer, the term of this patent is extended or adjusted under 35 U.S.C. 154(b) by 324 days.

This patent is subject to a terminal disclaimer.

(21) Appl. No.: 13/969,029

(22) Filed: Aug. 16, 2013

(65) Prior Publication Data

US 2013/0329699 A1    Dec. 12, 2013

Related U.S. Application Data

(63) Continuation of application No. 12/601,730, filed as application No. PCT/EP2008/056120 on May 19, 2008, now Pat. No. 8,543,131.

(30) Foreign Application Priority Data

May 25, 2007    (EP) .................................... 07108939

(51) Int. Cl.
*H04W 36/00*      (2009.01)
*H04W 8/08*      (2009.01)

(52) U.S. Cl.
CPC ......... *H04W 36/0033* (2013.01); *H04W 8/08* (2013.01); *H04W 8/085* (2013.01)

(58) Field of Classification Search
CPC .... H04W 36/0033; H04W 8/08; H04W 8/085
USPC ................................................... 370/329, 331
See application file for complete search history.

(56) References Cited

U.S. PATENT DOCUMENTS

| 6,889,045 | B2 | 3/2005 | Pan et al. |
| 8,543,131 | B2* | 9/2013 | Premec ...................... 455/456.1 |
| 2008/0084842 | A1* | 4/2008 | Xiang et al. .................. 370/329 |
| 2008/0227452 | A1* | 9/2008 | Sayeedi ............. H04W 76/021 |
| | | | 455/436 |
| 2008/0273496 | A1* | 11/2008 | Wu .............................. 370/331 |
| 2009/0235938 | A1* | 9/2009 | Roach ........................... 128/891 |
| 2009/0239538 | A1 | 9/2009 | Motegi et al. |

FOREIGN PATENT DOCUMENTS

| CN | 1859247 | 11/2006 |
| RU | 2292666 | 1/2007 |

(Continued)

OTHER PUBLICATIONS

Russian Office Action dated Feb. 27, 2013 for corresponding Russian Application No. 2009148237/07.

(Continued)

*Primary Examiner* — Hassan Kizou
*Assistant Examiner* — Abdullahi Ahmed
(74) *Attorney, Agent, or Firm* — Brake Hughes Bellermann LLP (57) ABSTRACT

A method, system and devices are provided for location update in an e.g. WiMAX based network. An authenticator function is informed on the location of a data path function after a handover has taken place.

12 Claims, 3 Drawing Sheets

(56) References Cited

FOREIGN PATENT DOCUMENTS

WO     2007005309     1/2007
WO     2007024520     3/2007

OTHER PUBLICATIONS

WI Max Forum, Network Architecture, (Stage 2: WiMAX Interworking with DSL, Architecture Tenets, Reference Model and Reference Points, WiMAX Interworking with AM DSL, 3GPP—WiMAX Interworking, 3GPP2—WiMAX Interworking), Release 1.0.0, (Stage 3: Detailed Protocols and Procedures), Release 1.0.0, Mar. 28, 2007, WiMAX Forum.
Prakash Iyer et al, AII-IP Network Architecture for Mobile WiMAX, Mobile WiMAX Symposium, 2007.1 EEE, IEEE, PI, Mar. 2007 (Mar. 2007), pp. 54-59, XP031079204, ISBN: 1-4244-0957-8.
Office Action dated Aug. 28, 2012 in corresponding U.S. Appl. No. 12/601,730.
Office Action dated Dec. 31, 2012 in corresponding U.S. Appl. No. 12/601,730.
Advisory Action dated Mar. 13, 2012 in corresponding U.S. Appl. No. 12/601,730.
Notice of Allowance dated May 22, 2013 in corresponding U.S. Appl. No. 12/601,730.
U.S. Appl. No. 12/601,730, filed Apr. 29, 2010, Domagoj Premec, Nokia Siemens Networks OY.

\* cited by examiner

FIG. 4

METHOD, SYSTEM AND DEVICE FOR LOCATION UPDATE IN NETWORKS

CROSS REFERENCE TO RELATED APPLICATIONS

This application is a continuation of U.S. patent application Ser. No. 12/601,730, filed Apr. 29, 2010, which is a U.S. National Stage of International Application No. PCT/EP2008/056120, filed May 19, 2008 and claims the benefit thereof. The International Application claims the benefit of European Application No. 07108939, filed on May 25, 2007, all of which are incorporated by reference herein in their entirety.

BACKGROUND

1. Field

This disclosure generally relates, without being restricted thereto, to devices, systems and/or methods configured to handle or manage communication signalling or data traffic to, from and between entities such as terminals.

2. Description of the Related Art

Mobility management of a mobile entity or terminal e.g. of a subscriber may be based on mobile IP, internet protocol. WiMAX, Worldwide Interoperability for Microwave Access, defines standards for network access. As an example, layer 3 mobility management in a WiMAX based architecture such as WiMAX Network Working Group, NWG, Release 1.0 networks as described in WiMAX NWG Stage 2 or 3, "WiMAX End-to-End Network System Architecture", Mar. 28, 2007, "http://www. wimaxforum.org/technology/documents/WiMAXNetworkArchitectureStage2-3 Rell..0.0.zip", is based on mobile IP, as described in section 4.8 of the document. In the context of WiMAX NWG specification the mobility management based on mobile IP (either mobile IP version 4, MIPv4, or mobile IP version 6, MIPvβ) is called CSN anchored handover. CSN stands for a connectivity serving network which may be based on WiMAX.

During CSN anchored mobility management some network functions responsible for handling a mobile station, MS, can be relocated to a gateway of an access service network, ASN GW, which is closer to a base station BS where the mobile station MS is currently attached.

In particular, functions that may be relocated may include one or more of the following, an anchor data path function, DPF, a foreign agent, FA, function (in case of IPv4) and an access router, AR, function (in case of IPv6).

In a WiMAX functional model, an anchor data path function can be collocated with a foreign agent and/or access router function in case of IPv6. Functions that remain in the original ASN GW may e.g. be an authenticator function and a proxy mobile IP, PMIPv4, client function which are also collocated. Also some other functions remain in the original access services network gateway like accounting client and anchored service flow authorization, SFA.

SUMMARY

In accordance with at least one or all of the embodiments discussed herein, an improvement is provided as to locating functions e.g. after a handover, thus allowing improved control.

In accordance with one, more or all of the embodiments, a method or devices, system, computer program product, computer program, chip and/or module, is provided for location update in a network wherein, when a function is relocated from a first entity to a second entity, the second entity informs the first or a third entity on the location of the relocated function.

The method or devices, system, computer program product, computer program, chip and/or module may include at least one or, in any arbitrary combination, more or all of the following features: the function is relocated to the second entity due to a handover procedure; the handover is a connectivity service network anchored handover; the function that is relocated during handover is an anchor data path function; a function that remains in the first or another entity is an authenticator function; the authenticator function is informed on the location of the relocated anchor data path function; a mobility management of a mobile entity or terminal is based on at least one of mobile IP, internet protocol, and WiMAX, Worldwide Interoperability for Microwave Access; the mobility management is a layer 3 mobility management in a WiMAX based architecture; at least one of the first, second or third network entities is a gateway; the gateway is an access services network gateway, which provides an anchor data path function; at least one of the entities such as a connectivity services network is implemented in accordance with a worldwide interoperability for microwave access, WiMAX, specification; a terminal or mobile node or station subject to the handover is a mobile or stationary device such as a mobile phone, user equipment, mobile station, a computer such as a personal digital assistant, laptop, or any other type of communication device; an authenticator or authenticator function remains in a gateway; an update of the authenticator or authenticator function with the actual location of anchor data path function after CSN-anchored handover in WiMAX networks is provided: an authenticator or a gateway in which the authenticator is located, is informed on the actual location of an anchor data path function after successful completion of a handover; upon successful completion of the handover, e.g. CSN MM handover, a target data path function, which is the new anchor data path function, informs the authenticator about its location; after a connectivity service network anchored handover is completed, a gateway or a target foreign agent sends a message to the or a gateway such as a success message or an Anchor DPF HO_Rsp (success) message; the target data path function or another component of gateway sends a message, e.g. a context report message Context_rpt message, to a gateway or to the authenticator in the gateway; the report message, e.g. Context rpt message, is sent at the same time when the gateway sends the success message; the report message contains the address of the new anchor data path function, such as a new anchor data path function identifier, e.g. new anchor DPF ID; upon receipt of the report message containing the address of the anchor data path function the authenticator updates its notion of the location or address or identifier of the anchor data path function for the mobile station; the authenticator confirms the receipt of the report message by sending a message, e.g. an acknowledgment message, to the gateway or the target data path function; a target foreign agent function sends a message to the authenticator function containing the address of the new anchor data path function; the message includes, in addition to a context purpose indicator and/or a base station information, an anchor data path function identifier; the context purpose indicator may have a length of four octets, one of the bits, e.g. Bit #5, indicating an anchor data path function DPF address update; setting this indicating bit requests that the receiver of the message updates the address of the anchor data path function associated with the mobile station subject to handover, in its context table.

The embodiments thus provide a method, system, devices, program and module related to location update such as update of an authenticator with an actual location of anchor data path function, for example after a handover such as a network anchored handover, e.g. a CSN-anchored handover, in one or more networks such as WiMAX networks.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1:
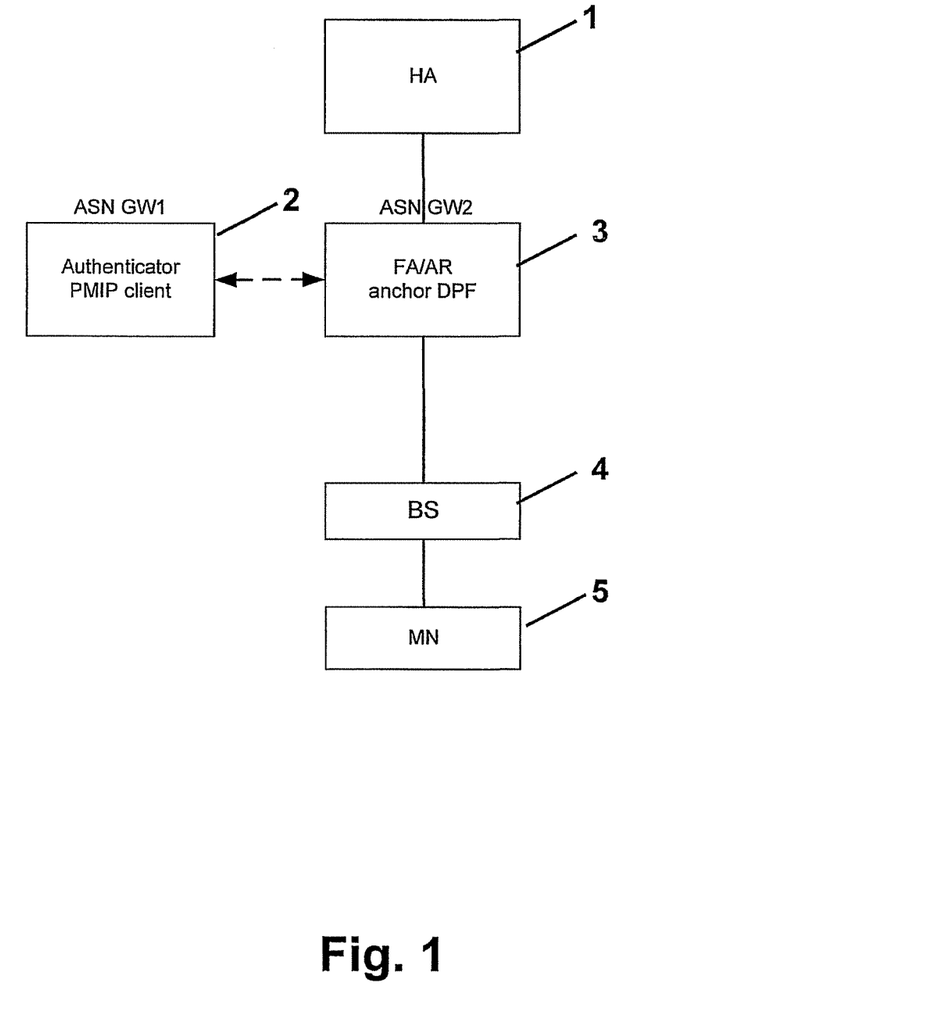
FIG. 1 an embodiment showing a device structure and method, and a location of functions after an initial handover.

In FIG. 1 and the other drawings, a home agent, HA, 1 is provided which is configured to communicate with a gateway such as gateway 3 which is an access services network gateway ASN GW2 and is, or is configured to act or function as, at least one of or all of a foreign agent FA, an access router AR, or an anchor data path function DPF. A gateway 2 is an access services network gateway, ASN GWI, and is, or is configured to act or function as, at least one of or all of an authenticator and a proxy such as a proxy mobile IP client, PMIP client. The gateway 3 is configured to communicate with a base station, BS, 4 to which a terminal such as a mobile node, MN, 5 is attached. The base station 4 and a connectivity services network may be implemented in accordance with the WiMAX specification. The mobile node 5 may also be a mobile station, MS.

In this and any other embodiment, the terminal or mobile node or station 5 can be a mobile or stationary device such as a mobile phone, user equipment, mobile station, a computer such as a personal digital assistant, laptop, or any other type of communication device.

FIG. 1 shows a location of functions after a first handover, e.g. a CSN anchored handover. The mobile station 5 was initially attached to the network through the gateway 2, ASN GWI, and then moved to the gateway 3, ASN GW2. As part of a CSN anchored mobility management procedure, the foreign agent, FA, and anchor data path functions, DPF functions, were relocated to the gateway 3, ASN GW2, while the authenticator function remained in gateway 2, ASN GWI. The dashed line represents a signalling interface while solid lines represent a MS data plane.

In accordance with one, more or all of the embodiments, the authenticator function is always aware of the location of the anchor data path function. This provides several benefits.

If the authenticator wants to re-authenticate a subscriber, e.g. because an authorized session life time is about to expire, it must initiate the re-authentication process by sending a signalling message, e.g. a WiMAX signalling message, to the anchor data path function. Further, if the authenticator received a disconnect request from a server, e.g. from a home authentication, authorization and accounting server, H-AAA server, it must initiate the session tear down by sending an appropriate message, e.g. a WiMAX signalling message, to the anchor data path function.

The authenticator may decide on its own or due to human intervention via a management console, or as part of overload recovery procedure or for any other reason, to terminate the session with the mobile station, MS session. Again, it must be able to send an appropriate message, e.g. WiMAX signalling message, to the anchor data path function.

In the scenario in FIG. 1 the gateway 2, ASN GWI, where the authenticator is located, is aware of the address of the anchor data path function, DPF function, which is in the gateway 3, ASN GW2, because the gateway 2, ASN GWI, hosted the anchor DPF function prior to its transfer to the gateway 3, ASN GW2, and thus it was directly involved in the relocation of the anchor data path function DPF. Therefore, the gateway 2 knows the new location of the anchor DPF.

However, a subsequent relocation of the anchor DPF function, e.g. in case of a CSN anchored mobility management, MM, will not involve the gateway 2, ASN GWI. Thus the authenticator will not know the correct location of the anchor data path function DPF after one or more subsequent handovers, e.g. CSN MM handovers.

Figure 2:
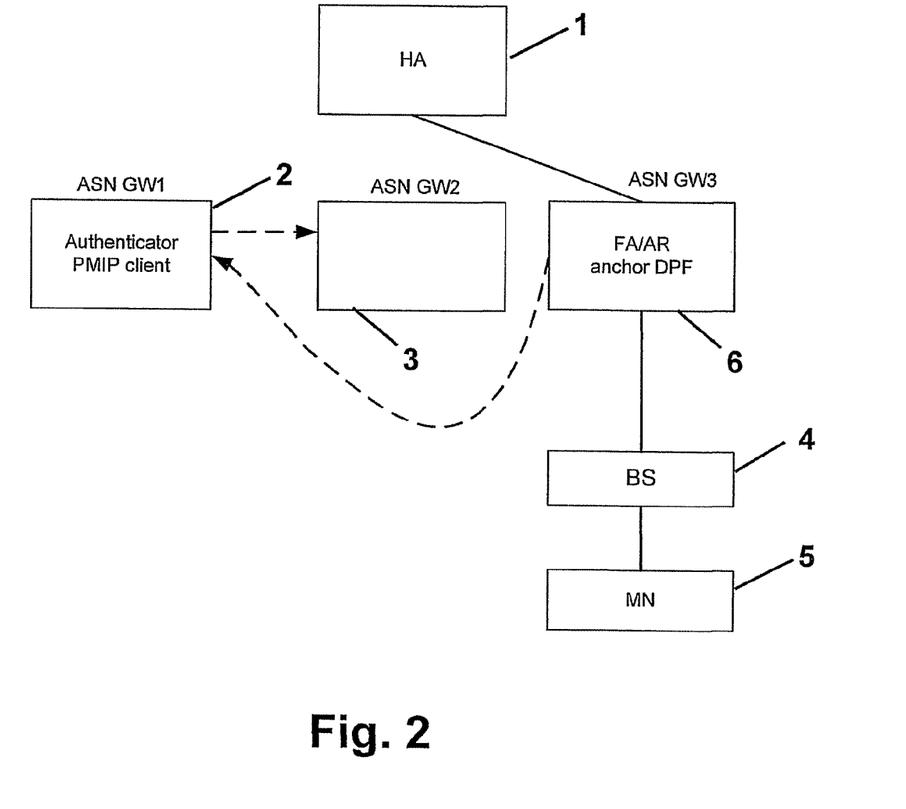
FIG. 2 another embodiment showing a device structure and method and a location of functions after a subsequent handover.

This configuration is shown in FIG. 2. The anchor data path function, DPF function, is now located in a gateway 6 which may be an access services network gateway, ASN GW3. However, the authenticator in the gateway 2, ASN GWI, is not aware of this relocation since it has not played any role in this handover, e.g. CSN MM handover. After the handover is completed, the gateway 3, ASN GW2 is not involved in any way in handling of this particular mobile station or node 5. Since the authenticator was not updated with the new anchor DPF function, the anchor DPF entry in authenticator's context table still points to the gateway 3, ASN GW2, which is incorrect.

The anchor DPF function is aware of a location of the authenticator function since the address of authenticator is transferred as part of the context during access services network, ASN, anchored mobility management. The dashed lines in FIG. 2 indicate that the anchor data path function DPF is able to send one or more messages to the authenticator of the mobile station or node 5, but not vice versa.

The embodiments provide a method, system, device, program and module related to location update such as update of an authenticator with an actual location of anchor data path function, for example after a handover such as a network anchored handover, e.g. a CSN-anchored handover, in one or more networks such as WiMAX networks.

One embodiment solution may be or is specific to a mode involving proxy mobile IP version 4, PMIPv4 mode. In proxy mobile internet protocol version 4, PMIPv4, mode the proxy mobile internet protocol, PMIP, client is always collocated with the authenticator. As described in section 4.8.2.3.7.1 of the above cited standard, the target anchor DPF function informs the PMIPv4 client of the successful MIP relocation (step 7 in FIG. 4-59). Since the PMIPv4 client and authenticator are always collocated in the same node, the authenticator is also aware of the new anchor DPF function. But this is specific only to PMIPv4 mode. In other cases such as a client MIPv4 or client MIPvβ terminals, this approach fails since there is no PMIP client that is involved in the CSN MM handover procedure.

In accordance with one or some embodiments, a more general solution is provided in which the authenticator may initiate its own relocation to the anchor DPF function, e.g. immediately after an initial CSN MM handover is executed. This is the case shown in FIG. 1 where the authenticator is still aware of the correct address of the anchor DPF function. In other words, the first CSN MM handover and every subsequent CSN MM handover can immediately, or at an appropriate timing, be followed by the relocation of the authenticator. This approach involves relocation of authenticator and possibly a re-authentication of the MS. As the re-authentication involves round trips to H-AAA server, this may turn out to be a lengthy procedure. Further, there is no need to re-authenticate the MS, the authorization and the security keys are still valid. CSN MM handover procedures and (re-) authentication are completely separate procedures and can be kept separate. If the MS moves fast, it may already undergo or even complete a second CSN MM handover before the authenticator relocation could be completed. This could lead to several race conditions and error scenarios.

In accordance with one, more or all of the embodiments, an update of the authenticator with the actual location of anchor data path function after CSN-anchored handover in WiMAX networks is provided.

The embodiments relate to WiMAX or any other type of network concept or structure such as wireless local area network etc.

The embodiments are able to improve an insufficiency in the handover mechanism in networks such as WiMAX networks. In accordance with one, more or all of the embodiments, the authenticator or the gateway, e.g. ASN-GW, in which the authenticator is located, is informed on the actual location of the anchor data path function (DPF) after successful completion of a handover such as a CSN-anchored handover. The authenticator function is hence always aware of the location of the anchor data path function DPF function, allowing proper and quick handling e.g. of re-authentication of the subscriber (session expiration), disconnect request from H-AAA server, termination of Mobile Station session, etc.

In accordance with one, more or all of the embodiments, upon successful completion of the handover, e.g. CSN MM handover, the target data path function DPF function, which is the new anchor DPF function, informs the authenticator about its location.

The terminal and/or an access network or access services network may be configured for communication based on mobile worldwide interoperability for microwave access, WiMAX.

Figure 3:
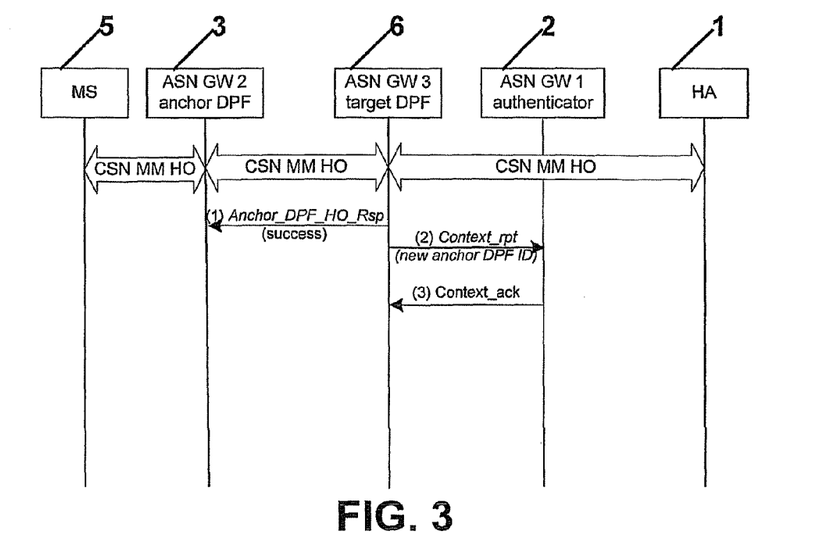
FIG. 3 a further embodiment showing a structure and method and a location of functions after a subsequent handover.

FIG. 3 depicts an embodiment in more detail for a case where the anchor data path function DPF moves from gateway 3, ASN GW2, to gateway 6, ASN GW3 while the authenticator is located in gateway 2, ASN GW 1. In particular, after the CSN anchored handover is completed, as illustrated by the thick hollow lines between the mobile station 5 and the gateway 3, between the gateways 3, 6 and between the gateway 6 and the home agent 1, inscribed "CSN MM HO", connectivity service network mobility management handover, the gateway 6 or a target foreign agent sends, in response to the ASN functional entity, a message (1) to the gateway 3 such as an Anchor DPF HO_Rsp (success) message as per section 4.8.2.1.4, to gateway 3, see FIG. 4-59 step 8 and section 4.8.3.3.2 of the above WiMax specification.

Further, in accordance with one, more or all of the embodiments, the target data path function DPF function or another component of gateway 6, sends a message (2), e.g. a context report message Context rpt message, to the gateway 2 or to the authenticator in gateway 2. The Context rpt message (2) can be sent at the same time, or earlier or later than the time when the gateway 6 sends the success message (1), e.g. the Anchor_DPF_HO Rsp message in response to an Anchor DPF HO_Req message.

The message (2), e.g. Context_rpt message, contains the address of the new anchor data path function DPF function such as a new anchor data path function identifier, "new anchor DPF ID". Upon receipt of the Context_rpt message containing the address of the anchor data path function DPF the authenticator in gateway 2 updates its notion of the location or address or identifier of the anchor data path function DPF function for this mobile station 5. The authenticator optionally confirms the receipt of the message (2), Context_rpt message, by sending a message, e.g. an acknowledgment message (3), Context_ack message, to the gateway 6 or the target data path function. This procedure may be defined to be mandatory for all scenarios except for PMIPv4 where it may be optional.

The disclosed solution and embodiments have several advantages including, but not limited to, allowing the authenticator to always be aware of the current location of the anchor DPF for a respective mobile station. Further, it is a generic solution able to cover all scenarios such as PMIPv4, client MIPv4, client MIPvβ, and, e.g. when adopted into WiMAX specification also the PMIPvβ, etc. The solution does not couple a CSN MM handover procedure with a (re-) authentication of the subscriber. In addition, it can be implemented based on existing or modified messages and, as such, does not introduce any major changes into the e.g. WiMAX NWG Rel1.0 specification.

In the following, a further embodiment will be described, enabling updating the anchored authenticator with the location of the anchor DPF after CSN MM handover so as to avoid a case of CMIP MS where, after the CSN anchored handover is executed, an anchored authenticator is not updated with the location of the new anchor DPF function. The anchored authenticator should be aware of the location of the anchor DPF function for at least one or more of the following reasons. If the authenticator receives a DISCONNECT message from the AAA server or function, it must be able to initiate MS session tear down; it must be able to initiate re-authentication; and the anchor SFA needs to be aware of the location of the serving DPF for dynamic SF establishment.

This and other embodiments provide a solution by providing the feature that, at the end of CSN MM HO, the new anchor DPF informs the authenticator of its location by a message sequence such as a Context rpt/Context Ack message sequence.

In the above mentioned WiMAX specification, the following features may be added and text may be added at the end of stage 3 section 4.8.3.3.2, page 215, describing FA requirements.

In response to the Anchor data path function DPF HO Req message the target foreign agent FA shall respond to the ASN functional entity with an Anchor data path function DPF HO Rsp message. The further processing of the resulting RRQ and RRP at the target FA for the MS may be as per section 4.8.2.1.4.

The Anchor DPF HO Rsp Message may include an information element R3 Operation Status in section 5.3.2.167 which provides a success or failure indication.

After the CSN anchored handover is successfully completed the target FA function sends a message such as a Context_rpt message to the authenticator function. The Context rpt message contains the address of the new anchor DPF function. Upon receipt of the Context rpt message containing the address of the new anchor DPF the authenticator updates its notion of the location of the anchor DPF function for this MS. The authenticator confirms the receipt of the Context rpt message by sending the Context ack message.

As to AR/NAS and DHCPvβ Proxy Operation, the target access router AR (target access services network) may receive a relocate request Anchor_DPF_Relocate_Req from an ASN Functional Entity to trigger a forced or regular handover. Subsequently, the target AR sends a RA to the MS to reconfigure its care-of address CoA (if stateless auto-configuration of CoA is used in the ASN). It is assumed that the target AR has received the MIP6 bootstrap information from the Serving AR along with other state information via the context transfer procedure. The Target AR performs the same functions as described in section 5.6.3.1.2 of the above specification to help the MS bootstrap the MIP6 parameters in case, the MS' DHCβ Client requests for such info in order to send an Anchor DPF Relocate_Rsp message to the ASN functional entity to complete the handover procedure and update the ASN functional entity with new mobility information.

After the CSN anchored handover is successfully completed the target AR function sends a report or information message, e.g. the Context rpt message, to the authenticator function. The report or information message, e.g. the Context rpt message, contains the address of the new anchor data path function DPF function. Upon receipt of this message, e.g. Context rpt message, containing the address of the new anchor DPF the authenticator updates its notion of the location of the anchor data path function DPF function for this MS. The authenticator confirms the receipt of the message, e.g. Context rpt message by sending a confirmation message, e.g. the Context_ack message.

The message, e.g. Context_rpt message, includes, in addition to a context purpose indicator and/or a base station information BS Info, an anchor data path function, DPF, Identifier. The context purpose indicator may be as follows. The context purpose indicator may have a length of e.g. four octets. In the e.g. 32-bit bitmask, the bits may have the following content or meaning. Bit #0=MS AK Context; Bit #1=MS Network Context; Bit #2=MS MAC Context; Bit #3=Service Authorization Context; Bit #4=FA Context; and Bit #5=Anchor data path function DPF address update which is a novel definition added to the context purpose indicator. The other bits can be reserved and can be reset.

The context purpose indicator indicates the type of context to be delivered. Setting Bit #0 requests delivering AK Context associated with a particular MS. Setting Bit #1 requests delivery Network Addressable IDs (i.e. BS ID, Anchor GW ID, Authenticator ID, PC ID) associated with a particular MS and known to the responder. Setting Bit#2 requests delivery of MAC Context associated with a particular MS that is available in BS. Setting Bit#3 requests delivery of service authorization and policy context (e.g. authorization code) associated with a particular MS. Setting Bit#4 requests delivery of FA context associated with a particular MS.

Setting bit#5 requests that the receiver of the message updates the address of the anchor DPF associated with the MS in its context table.

The message (2), e.g. Context_rpt message, therefore includes one, two or more parameters (such as an anchor data path function identifier like Anchor DPF Identifier, and an address update indicator or parameter like e.g. Anchor DPF address update of e.g. Bit#5) for the purpose of informing the authenticator on the new location of the anchor data path function, and on the update request.

Messages or message primitives that use this TLV (=Type-Length-Value) are, in an or more or all embodiments, context delivery messages.

Figure 4:
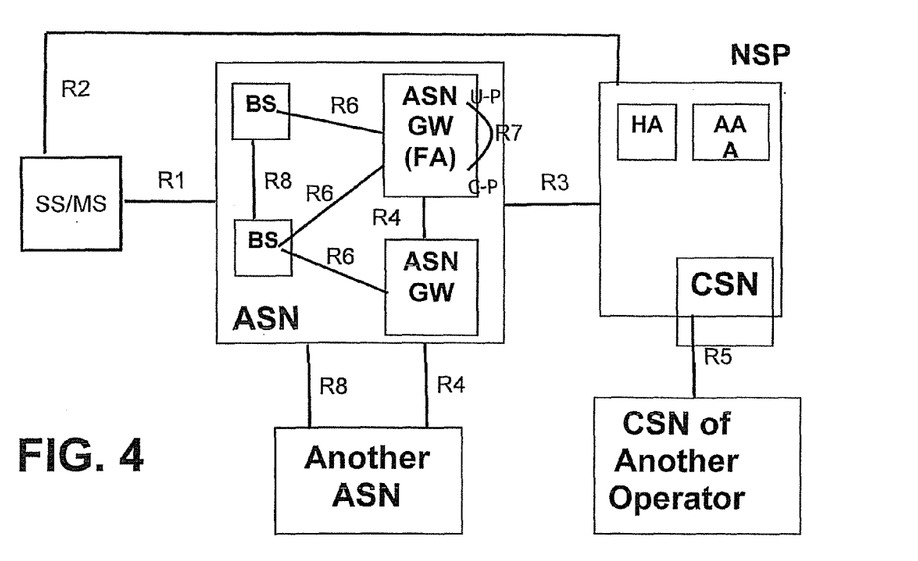
FIG. 4 a basic structure of an example of a WiMAX architecture.

FIG. 4 shows an example of a WiMAX architecture to which the above features and embodiments may be applied. A mobile station MS or SS may communicate with an access service (s) network ASN via an interface RI. The access service (s) network may include one or more base stations BS and one or more access services network gateways ASN-GW, e.g. gateway 6, which may act as, or form part of, a foreign agent FA. The access services network ASN may communicate with another access services network via interfaces R4, R8, and with a connectivity service network CSN of a network service provider NSP via interface R3. The connectivity service network CSN of the network service provider NSP further includes a home agent HA and a function, module, device for authentication, authorization and accounting, AAA. The connectivity service network CSN of a network service provider NSP may communicate with another connectivity service network CSN of another operator via interface R5.

Further, in accordance with at least one or all of the embodiments, a computer program product is provided which is adapted to carry out any of the steps or functions when run on a computer or processor.

The sequence and content of the steps or functions or elements shown in the drawings is only an example and may also be exchanged or altered, or combined, in any arbitrary manner.

The system also includes permanent or removable storage, such as magnetic and optical discs, RAM, ROM, etc. on which the process and data structures of the present embodiment can be stored and distributed and computers or processors upon which the system can be implemented. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method, comprising:
   relocating an anchor data path function in a network from a first entity of an access service network (ASN) to a second entity of said access service network (ASN), where the anchor data path function is relocated to the second entity due to a handover procedure for handover of a mobile station, and the handover is a connectivity service network anchored handover;
   informing a third entity by the second entity of a location of the relocated function when the anchor data path function is relocated from said first entity of said access service network (ASN) to said second entity of said access service network (ASN), wherein the third entity is a gateway that includes an authenticator to authenticate the mobile station;

sending, by said second entity, a context report message to said third entity after a connectivity service network anchored handover is completed, where said context report message contains an address of said anchor data path function; and receiving, by the second entity from the third entity, a context acknowledgment message confirming receipt, by the third entity, of the context report message.

2. A method according to claim 1, wherein:
the second entity is a gateway, a target foreign agent (FA), a target foreign agent function, an access router (AR) or an access router function, and
said third entity is an authenticator.

3. A method according to claim 1, which comprises at least one of the following features:
a function that remains in said third entity is an authenticator function; and
said authenticator function is informed of the location of the relocated anchor data path function.

4. A method according to claim 1, which comprises at least one of the following features:
a mobility management of a mobile entity (SS/MS) or terminal (MS) is based on at least one of mobile IP, internet protocol, and Worldwide Interoperability for Microwave Access (WiMAX);
the mobility management is a layer 3 mobility management in a WiMAX based architecture;
at least one of said first, second or third network entities is a gateway;
said gateway is an access services network gateway, which provides said anchor data path function;
at least one of said entities such as a connectivity services network is implemented in accordance with a worldwide interoperability for microwave access (WiMAX) specification;
a terminal or mobile node or station subject to said handover is a mobile or stationary device comprising one of a mobile phone (MS), user equipment (UE), mobile station (MS), a computer comprising one of a personal digital assistant, laptop, or any other type of communication device;
an authenticator or authenticator function remains in a gateway; and
an update of the authenticator or authenticator function with the actual location of said anchor data path function after CSN-anchored handover in WiMAX networks is provided.

5. A method according to claim 1, which comprises at least one of the following features:
an authenticator or a gateway (ASN GW) in which said authenticator is located, is informed of the actual location of said anchor data path function after successful completion of a handover;
upon successful completion of said handover a target data path function, which is a previously presented anchor data path function, informs said authenticator about its location;
after a connectivity service network anchored handover is completed, a gateway or a target foreign agent (FA) sends a message to the gateway;
said target data path function or another component of gateway sends a message to a gateway or to said authenticator in the gateway (ASN GW);
said report message is sent at the same time when said gateway sends the success message;
said report message contains the address of the previously presented anchor data path function;
said authenticator confirms the receipt of the report message by sending an acknowledgment message to said gateway or said target data path function;
a target foreign agent function sends a message to said authenticator function containing the address of the previously presented anchor data path function;
said report message includes, in addition to a context purpose indicator and/or a base station information, an anchor data path function identifier;
said report message is a Context_rpt message;
said report message includes one, two or more parameters among an anchor data path function identifier, and an address update indicator or parameter for the purpose of informing said authenticator of the previously presented location of said anchor data path function, and on the update request;
the context purpose indicator may have a length of four octets, one of the bits or parameters of said report message or context purpose indicator indicating an anchor data path function (DPF) address update; and
setting this indicating bit requests that the receiver of said report message updates the address of said anchor data path function associated with said mobile station (MS) subject to handover, in a context table.

6. The method of claim 1 and further comprising:
updating, by said third entity, the location or address or identifier of said anchor data path function for the mobile station (MS) upon receipt of the context report message containing the address of said anchor data path function.

7. A chip module including hardware and software parts for implementing the features recited in claim 1 comprising:
a mechanism configured to:
relocate a function in a network from a first entity of an access service network (ASN) to a second entity of said access service network (ASN), where said function is relocated to said second entity due to a handover procedure, said function is an anchor data path function, and said handover is a connectivity service network anchored handover;
inform a third entity by said second entity of a location of said relocated function when said function is relocated from said first entity of said access service network (ASN) to said second entity of said access service network (ASN);
send, by said second entity, a context report message to said third entity after a connectivity service network anchored handover is completed, where said report message contains an address of said anchor data path function;
update, by said third entity, the location or address or identifier of said anchor data path function for a mobile station (MS) upon receipt of said report message containing the address of said anchor data path function; and
confirm, by said third entity, the receipt of said report message by sending a context acknowledgment message to said second entity.

8. A network entity, comprising at least one processor and at least one memory including computer instructions that, when executed by the at least one processor, cause the network entity to:
  inform, when a function is relocated to said network entity, another entity of an access service network (ASN) on a location of the relocated function, where said function is relocated to said another entity due to a handover procedure, said handover is a connectivity service network anchored handover, and the function that is relocated during a handover is an anchor data path function;
  inform said another entity, or an authenticator function included in the another entity, of the location of said relocated anchor data path function;
  inform an authenticator or a gateway (ASN GW) in which the authenticator is located, of the actual location of an anchor data path function after successful completion of a handover;
  send, by the target data path function or another component of said network entity, a context report message where said report message contains the address of said anchor data path function; and
  obtain, by said network entity where the function is relocated, a confirmation of said report message by receiving a context acknowledgment message from said another entity.

9. A network entity according to claim 8, which comprises at least one of the following features:
  said network entity is a gateway;
  said gateway is an access services network gateway, which provides an anchor data path function;
  said network entity is implemented in accordance with a worldwide interoperability for microwave access (Wi-MAX) specification;
  after a handover is completed, said network entity sends a success message to the gateway;
  said target data path function or said another component of said network entity sends said context report message to the gateway or to said authenticator in the gateway (ASN GW);
  said report message contains said address of the previously presented anchor data path function;
  said network entity sends a message to the authenticator function containing the address of the previously presented anchor data path function;
  said message includes, in addition to a context purpose indicator and/or a base station information, an anchor data path function identifier; and
  said context purpose indicator has a length of four octets, one of the bits indicating an anchor data path function (DPF) address update.

10. A network entity, comprising at least one processor and at least one memory including computer instructions that, when executed by the at least one processor, cause the network entity to:
  receive, when a function is relocated to another entity, a message from said another entity on a location of the relocated function, where said function that is relocated during a handover is an anchor data path function,
  provide an authenticator function;
  inform said authenticator function of the location of the relocated anchor data path function;
  update said authenticator or authenticator function with the actual location of said anchor data path function after a connectivity service network anchored handover;
  update, upon receipt of a report message containing an address of said anchor data path function, by said authenticator the location or address or identifier of said anchor data path function for a mobile station (MS); and
  confirm, by said authenticator, the receipt of said report message by sending an acknowledgment message, to the said another entity or the target data path function of said another entity.

11. An apparatus comprising at least one processor and at least one memory including computer instructions that, when executed by the at least one processor, cause the apparatus to:
  relocate an anchor data path function in a network from a first entity of an access service network (ASN) to a second entity of said access service network (ASN), where the anchor data path function is relocated to the second entity due to a handover procedure for handover of a mobile station, and the handover is a connectivity service network anchored handover;
  inform a third entity by the second entity of a location of the relocated function when the anchor data path function is relocated from said first entity of said access service network (ASN) to said second entity of said access service network (ASN), wherein the third entity is a gateway that includes an authenticator to authenticate the mobile station;
  send, by said second entity, a context report message to said third entity after a connectivity service network anchored handover is completed, where said context report message contains an address of said anchor data path function; and
  receive, by the second entity from the third entity, a context acknowledgment message confirming receipt, by the third entity, of the context report message.

12. The apparatus of claim 11 wherein the instructions further cause the apparatus to:
  update, by said third entity, the location or address or identifier of said anchor data path function for the mobile station (MS) upon receipt of the context report message containing the address of said anchor data path function.

* * * * *